(12) United States Patent
Murata et al.

(10) Patent No.: US 10,509,823 B2
(45) Date of Patent: Dec. 17, 2019

(54) INFORMATION PROVISION SYSTEM, VIEWING TERMINAL, INFORMATION PROVISION METHOD, AND INFORMATION PROVISION PROGRAMME

(71) Applicant: Rakuten, Inc., Shinagawa-ku, Tokyo (JP)

(72) Inventors: Yusuke Murata, Shinagawa-ku (JP); Kenjiro Numazu, Shinagawa-ku (JP); Ruka Sakurai, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 651 days.

(21) Appl. No.: 14/410,991

(22) PCT Filed: Dec. 25, 2012

(86) PCT No.: PCT/JP2012/083492
§ 371 (c)(1),
(2) Date: Dec. 23, 2014

(87) PCT Pub. No.: WO2014/002314
PCT Pub. Date: Jan. 3, 2014

(65) Prior Publication Data
US 2015/0339305 A1    Nov. 26, 2015

(30) Foreign Application Priority Data
Jun. 29, 2012    (JP) .................. 2012-147714

(51) Int. Cl.
*G06F 16/00*    (2019.01)
*G06F 16/738*    (2019.01)
(Continued)

(52) U.S. Cl.
CPC ............ *G06F 16/738* (2019.01); *G06F 16/29* (2019.01); *G06F 16/74* (2019.01); *G06F 16/9535* (2019.01)

(58) Field of Classification Search
CPC ........... G06F 17/3084; G06F 17/30241; G06F 17/30846; G06F 17/30867; G06F 16/9535; G06F 16/29
(Continued)

(56) References Cited

U.S. PATENT DOCUMENTS

| 2002/0123990 A1* | 9/2002 | Abe .................. G06F 17/30743 |
| 2007/0050406 A1* | 3/2007 | Byers ...................... G06F 16/48 |
| 2013/0129307 A1* | 5/2013 | Choe .................... H04N 5/2621 |
| | | 386/227 |

FOREIGN PATENT DOCUMENTS

| JP | 2002-325241 A | 11/2002 |
| JP | 2006-133618 A | 5/2006 |
| JP | 2011-013785 A | 1/2011 |

OTHER PUBLICATIONS

English Translation of International Preliminary Report on Patentability dated Jan. 8, 2015 issued in Patent Application No. PCT/JP2012/083492.

(Continued)

*Primary Examiner* — Grace Park
(74) *Attorney, Agent, or Firm* — Sughrue Mion, PLLC

(57) ABSTRACT

The information providing system includes the communication unit, the content database, the search unit and the map information generation unit. The communication unit acquires place information indicating a place. The content database stores place information indicating a place and specifying information specifying an expression part where an expression related to the place appears in content in association with each other. The search unit acquires the specifying information stored in association with the place information indicating a place within a specified range from the place indicated by the place information acquired by the communication unit from the content database. The map information generation unit outputs the specifying information acquired by the search unit.

16 Claims, 9 Drawing Sheets

| REGISTRATION No. | TITLE OF CONTENT | SPECIFYING INFORMATION | SCENE NAME | REGISTRATION PLACE INFORMATION | PLACE NAME |
|---|---|---|---|---|---|
| ... | ... | ... | ... | ... | ... |
| 1200043 | HISTORICAL BATTLE | ROW Q IN PAGE P TO ROW S TO PAGE R (T TO U MINUTES) | BATTLE SCENE BETWEEN AA AND BB | CC DEGREES IN LATITUDE DD DEGREES IN LONGITUDE | SEKIGAHARA |
| ... | ... | ... | ... | ... | ... |

(51) Int. Cl.
*G06F 16/74* (2019.01)
*G06F 16/9535* (2019.01)
*G06F 16/29* (2019.01)

(58) Field of Classification Search
USPC .......................................................... 707/722
See application file for complete search history.

(56) References Cited

OTHER PUBLICATIONS

International Search Report for PCT/JP2012/083492 dated Feb. 5, 2013 [PCT/ISA/210].

* cited by examiner

Fig.4

| REGISTRATION No. | TITLE OF CONTENT | SPECIFYING INFORMATION | SCENE NAME | REGISTRATION PLACE INFORMATION | PLACE NAME |
|---|---|---|---|---|---|
| ... | ... | ... | ... | ... | ... |
| 1200043 | HISTORICAL BATTLE | ROW Q IN PAGE P TO ROW S TO PAGE R (T TO U MINUTES) | BATTLE SCENE BETWEEN AA AND BB | CC DEGREES IN LATITUDE DD DEGREES IN LONGITUDE | SEKIGAHARA |
| ... | ... | ... | ... | ... | ... |

*Fig.5*
(a)
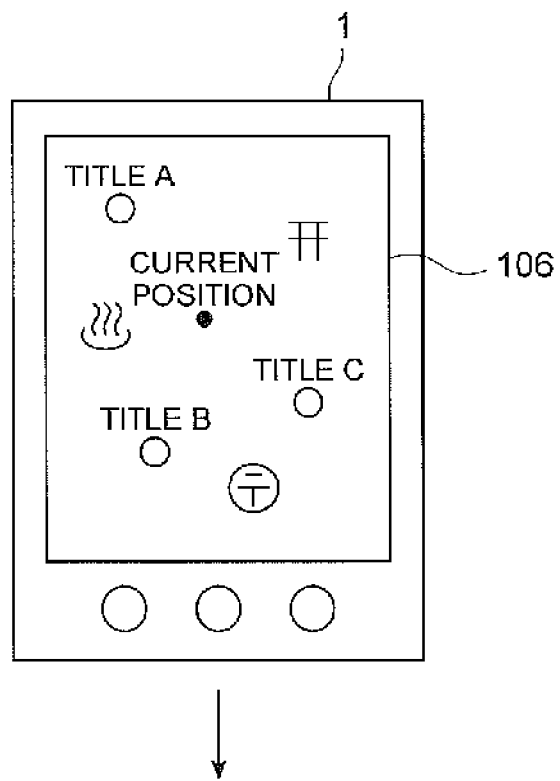
(b)
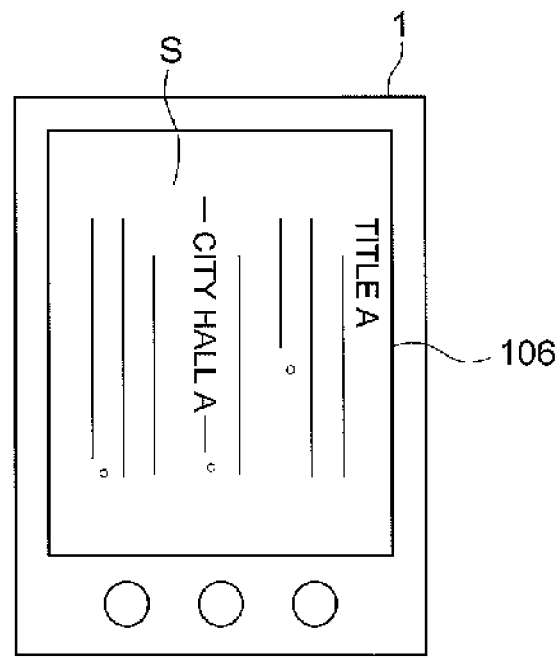

INFORMATION PROVISION SYSTEM, VIEWING TERMINAL, INFORMATION PROVISION METHOD, AND INFORMATION PROVISION PROGRAMME

CROSS REFERENCE TO RELATED APPLICATIONS

This application is a National Stage of International Application No. PCT/JP2012/083492 filed Dec. 25, 2012, claiming priority based on Japanese Patent Application No. 2012-147714 filed Jun. 29, 2012, the contents of all of which are incorporated herein by reference in their entirety.

TECHNICAL FIELD

The present invention relates to an information providing system, a viewing terminal, an information providing method, and an information providing program capable of displaying information related to content.

BACKGROUND ART

A technique for a mobile terminal to download video data from an information providing server has been proposed. For example, in the download system disclosed in Patent Literature 1, video work data from an information providing server is stored in a storage means included in a mobile communication terminal. In the information providing server, abstract versions that are collections of famous scenes of a plurality of video works are stored.

CITATION LIST

Patent Literature

Patent Literature 1: Japanese Unexamined Patent Application Publication No. 2002-325241
Patent Literature 2: Japanese Unexamined Patent Application Publication No. 2006-133618

SUMMARY OF INVENTION

Technical Problem

There are cases where you see or hear a certain place name and recognize that it is a place of a certain scene that appears in certain content such as a book or a video work. Then, even if you want to view the corresponding part of the content, you cannot recall the title and thus cannot specify the content in some cases. Further, even if the content can be specified, it takes time and effort to find where the corresponding part is in some cases.

The present invention has been accomplished to solve the above problems and an object of the present invention is thus to provide an information providing system, a viewing terminal, an information providing method, and an information providing program that enable a user to easily find a part where an expression related to a place appears in content containing the expression.

Solution to Problem

An information providing system according to one aspect of the present invention includes an acquisition means configured to acquire place information indicating a place, a search means configured to acquire, from a storage means configured to store place information indicating a place and specifying information specifying an expression part where an expression related to the place appears in content in association with each other, the specifying information stored in association with the place information indicating a place within a specified range from the place indicated by the place information acquired by the acquisition means, and an output means configured to output the specifying information acquired by the search means.

In the information providing system according to one aspect of the present invention, place information indicating a place is acquired first, and specifying information that is stored in association with place information indicating a place within a specified range from the acquired place information is acquired from the storage means. Then, the specifying information that specifies an expression part where an expression related to the place appears in the content is output. It is thereby possible to easily find the part where the expression appears in the content that contains the expression related to the place.

The information providing system according to another aspect may be able to communicate with a viewing terminal and may further include a determination means configured to determine whether purchasing of the content is done by a user of the viewing terminal, and the output means may transmit the specifying information to the viewing terminal when the determination means determines that the purchasing of the content is done.

In this aspect, it is determined whether purchasing of the content is done, and when it is determined that purchasing of the content is done, specifying information is transmitted to the viewing terminal. It is thereby possible to transmit the specifying information to the viewing terminal when purchasing of the content is done. As a result, the viewing terminal can specify the corresponding part of the purchased content based on the specifying information and display it.

The information providing system according to another aspect may further include a generation means configured to generate a trial read file containing at least part of an expression part specified by the specifying information, and the output means may transmit the trial read file to the viewing terminal when the determination means determines that the purchasing of the content is not done.

In this aspect, a trial read file that contains at least part of an expression part specified by specifying information is generated, and when it is determined that purchasing of the content is not done, the trial read file is transmitted to the viewing terminal. It is thereby possible to transmit the trial read file to the viewing terminal 1 and display it when purchasing of the content is not done.

In the information providing system according to another aspect, the generation means may generate an encrypted content file, and the output means may transmit the content file generated by the generation means to the viewing terminal after transmitting the trial read file, and after purchasing of the content file is done, transmit information for decrypting the encrypted content file.

In this aspect, an encrypted content file is generated first. Then, after a trial read file is transmitted, the content file is transmitted to the viewing terminal. After purchasing of the content file is done, information for decrypting the encrypted content file is transmitted. It is thereby possible to generate the encrypted content file and transmit it to the viewing terminal and, after purchasing of the content file is done, decrypt the content file.

In the information providing system according to another aspect, when a plurality of specifying information is acquired by the search means, the output means may output a plurality of expression parts specified by the plurality of specifying information in such a way that the expression parts can be displayed in combination.

In this aspect, when a plurality of specifying information is acquired, a plurality of expression parts specified by the plurality of specifying information are output in such a way that they can be displayed in combination. A user can thereby view the combined plurality of expression parts all together.

In the information providing system according to another aspect, the search means may acquire the specifying information relating to content belonging to a specific genre and stored in association with a place indicated by place information where an appearance percentage based on an appearance history of the place indicated by the place information acquired by the acquisition means is less than a specified percentage from the storage means.

In this aspect, specifying information that is stored in association with a place indicated by place information where an appearance percentage on the basis of an appearance history of the place indicated by the acquired place information is less than a specified percentage and that relates to the content belonging to a specific genre is acquired. A place where the appearance percentage is less than a specified percentage is likely to be a place where the place information is not usually acquired, and it is considered to be a place such as a business trip or travel destination. In such a case, the specifying information in the content belonging to a specific genre that is suitable for a place such as a business trip or travel destination, for example, is acquired. As a result, it is possible to display the specifying information suitable for a user that is considered to be in a place such as a business trip or travel destination.

The information providing system according to another aspect may further include a determination means configured to determine whether purchasing of the content is done, and the search means may acquire the specifying information relating to content determined that the purchasing is done and stored in association with a place indicated by place information where an appearance percentage based on an appearance history of the place indicated by the place information acquired by the acquisition means is less than a specified percentage from the storage means.

In this aspect, specifying information that is stored in association with a place indicated by place information where an appearance percentage on the basis of an appearance history of the place indicated by the acquired place information is less than a specified percentage and that relates to the content determined to be already purchased is acquired. A place where the appearance percentage is less than a specified percentage is likely to be a place where the place information is not usually acquired, and it is considered to be a place such as a business trip or travel destination. In such a case, the specifying information in the content that is determined to be already purchased is acquired. As a result, it is possible to display the specifying information suitable in the purchased content for a user that is considered to be in a place such as a business trip or travel destination.

The information providing system according to another aspect may further include a determination means configured to determine whether purchasing of the content is done, and the search means may acquire the specifying information relating to content determined that the purchasing is not done and stored in association with a place indicated by place information where an appearance percentage based on an appearance history of the place indicated by the place information acquired by the acquisition means is equal to or more than a specified percentage from the storage means.

In this aspect, specifying information that is stored in association with a place indicated by place information where an appearance percentage on the basis of an appearance history of the place indicated by the acquired place information is equal to or more than a specified percentage and that relates to the content determined to be not purchased is acquired. A place where the appearance percentage is equal to or more than a specified percentage is likely to be a place within the field of everyday activities where the place information is usually acquired. In such a case, the specifying information in the content that is determined to be not purchased is acquired. As a result, it is possible to display the specifying information suitable in the content that is not yet purchased and considered to be unknown by a user for the user who is familiar with the field of everyday activities.

An information providing system according to one aspect of the present invention includes an acquisition means configured to acquire place information indicating a place, a search means configured to acquire, from a storage means configured to store place information indicating a place and specifying information specifying an expression part where an expression related to the place appears in content in association with each other, the specifying information stored in association with the place information indicating a place within a specified range from the place indicated by the place information acquired by the acquisition means, and an output means configured to output at least part of an expression part specified by the specifying information acquired by the search means, the expression part acquired from a means of storing the content.

In the information providing system according to one aspect of the present invention, place information indicating a place is acquired first, and specifying information that is stored in association with place information indicating a place within a specified range from the acquired place information is acquired from the storage means. Then, at least part of an expression part where an expression related to the place appears in the content and that is acquired from a means of storing the content is output. It is thereby possible to easily find the part where the expression appears in the content that contains the expression related to the place.

A viewing terminal according to one aspect of the present invention is able to communicate with the above-described information providing system and includes a specifying means configured to specify the expression part in the content stored in a means of storing the content based on the specifying information output by the output means included in the information providing system, and a display means configured to display the expression part of the content specified by the specifying means.

In the viewing terminal according to one aspect of the present invention, an expression part in the content stored in a means of storing the content is specified based on the specifying information output from the output means included in the information providing system, and the specified expression part in the content can be displayed.

An information providing method according to one aspect of the present invention is an information providing method performed by an information providing system, the method including an acquisition step of acquiring place information indicating a place by the information providing system, a search step of acquiring, from a storage means configured to store place information indicating a place and specifying information specifying an expression part where an expression related to the place appears in content in association with each other, the specifying information stored in association with the place information indicating a place within a specified range from the place indicated by the place information acquired in the acquisition step by the information providing system, and an output step of outputting the specifying information acquired in the search means by the information providing system.

In the information providing method according to one aspect of the present invention, place information indicating a place is acquired first, and specifying information that is stored in association with place information indicating a place within a specified range from the acquired place information is acquired from the storage means. Then, the specifying information that specifies an expression part where an expression related to the place appears in the content is output. It is thereby possible to easily find the part where the expression appears in the content that contains the expression related to the place.

An information providing program according to one aspect of the present invention causes a computer to implement a function of an acquisition means to acquire place information indicating a place, a function of a search means to acquire, from a storage means to store place information indicating a place and specifying information specifying an expression part where an expression related to the place appears in content in association with each other, the specifying information stored in association with the place information indicating a place within a specified range from the place indicated by the place information acquired by the function of the acquisition means, and a function of an output means to output the specifying information acquired by the function of the search means.

In the information providing program according to one aspect of the present invention, place information indicating a place is acquired first, and specifying information that is stored in association with place information indicating a place within a specified range from the acquired place information is acquired from the storage means. Then, the specifying information that specifies an expression part where an expression related to the place appears in the content is output. It is thereby possible to easily find the part where the expression appears in the content that contains the expression related to the place.

A computer-readable recording medium according to one aspect of the present invention stores an information providing program that causes a computer to implement a function of an acquisition means to acquire place information indicating a place, a function of a search means to acquire, from a storage means to store place information indicating a place and specifying information specifying an expression part where an expression related to the place appears in content in association with each other, the specifying information stored in association with the place information indicating a place within a specified range from the place indicated by the place information acquired by the function of the acquisition means, and a function of an output means to output the specifying information acquired by the function of the search means.

In the computer-readable recording medium according to one aspect of the present invention, place information indicating a place is acquired first, and specifying information that is stored in association with place information indicating a place within a specified range from the acquired place information is acquired from the storage means. Then, the specifying information that specifies an expression part where an expression related to the place appears in the content is output. It is thereby possible to easily find the part where the expression appears in the content that contains the expression related to the place.

An information providing method according to one aspect of the present invention is an information providing method performed by an information providing system, the method including an acquisition step of acquiring place information indicating a place by the information providing system, a search step of acquiring, from a storage means configured to store place information indicating a place and specifying information specifying an expression part where an expression related to the place appears in content in association with each other, the specifying information stored in association with the place information indicating a place within a specified range from the place indicated by the place information acquired in the acquisition step by the information providing system, and an output step of outputting at least part of an expression part specified by the specifying information acquired in the search step, the expression part acquired from a means of storing the content, by the information providing system.

In the information providing method according to one aspect of the present invention, place information indicating a place is acquired first, and specifying information that is stored in association with place information indicating a place within a specified range from the acquired place information is acquired from the storage means. Then, at least part of an expression part specified by the specifying information that specifies an expression part where an expression related to the place appears in the content and that is acquired from a means of storing the content is output. It is thereby possible to easily find the part where the expression appears in the content that contains the expression related to the place.

An information providing program according to one aspect of the present invention causes a computer to implement a function of an acquisition means configured to acquire place information indicating a place, a function of a search means configured to acquire, from a storage means configured to store place information indicating a place and specifying information specifying an expression part where an expression related to the place appears in content in association with each other, the specifying information stored in association with the place information indicating a place within a specified range from the place indicated by the place information acquired by the function of the acquisition means, and a function of an output means configured to output at least part of an expression part specified by the specifying information acquired by the function of the search means, the expression part acquired from a means of storing the content.

In the information providing program according to one aspect of the present invention, place information indicating a place is acquired first, and specifying information that is stored in association with place information indicating a place within a specified range from the acquired place information is acquired from the storage means. Then, at least part of an expression part specified by the specifying information that specifies an expression part where an expression related to the place appears in the content and that is acquired from a means of storing the content is output. It is thereby possible to easily find the part where the expression appears in the content that contains the expression related to the place.

A computer-readable recording medium according to one aspect of the present invention stores an information providing program that causes a computer to implement a function of an acquisition means configured to acquire place information indicating a place, a function of a search means configured to acquire, from a storage means configured to store place information indicating a place and specifying information specifying an expression part where an expression related to the place appears in content in association with each other, the specifying information stored in association with the place information indicating a place within a specified range from the place indicated by the place information acquired by the function of the acquisition means, and a function of an output means configured to output at least part of an expression part specified by the specifying information acquired by the function of the search means, the expression part acquired from a means of storing the content.

In the computer-readable recording medium according to one aspect of the present invention, place information indicating a place is acquired first, and specifying information that is stored in association with place information indicating a place within a specified range from the acquired place information is acquired from the storage means. Then, at least part of an expression part specified by the specifying information that specifies an expression part where an expression related to the place appears in the content and that is acquired from a means of storing the content is output. It is thereby possible to easily find the part where the expression appears in the content that contains the expression related to the place.

Advantageous Effects of Invention

According to the present invention, it is possible to provide an information providing system, a viewing terminal, an information providing method, and an information providing program that enable a user to easily find a part where an expression related to a place appears in content containing the expression.

BRIEF DESCRIPTION OF DRAWINGS

FIG. 4 is a table diagram in a content DB.

FIG. 5 is a screen schematic diagram illustrating one example of the way of changing from display of map information to display of specifying information in the viewing terminal 1.

DESCRIPTION OF EMBODIMENTS

Embodiments of the present invention are described hereinafter in detail with reference to the appended drawings.

Note that, in the description of the drawings, the same or equivalent elements are denoted by the same reference symbols, and the redundant explanation thereof is omitted.

<1> Configuration of Information Providing System

Figure 1:
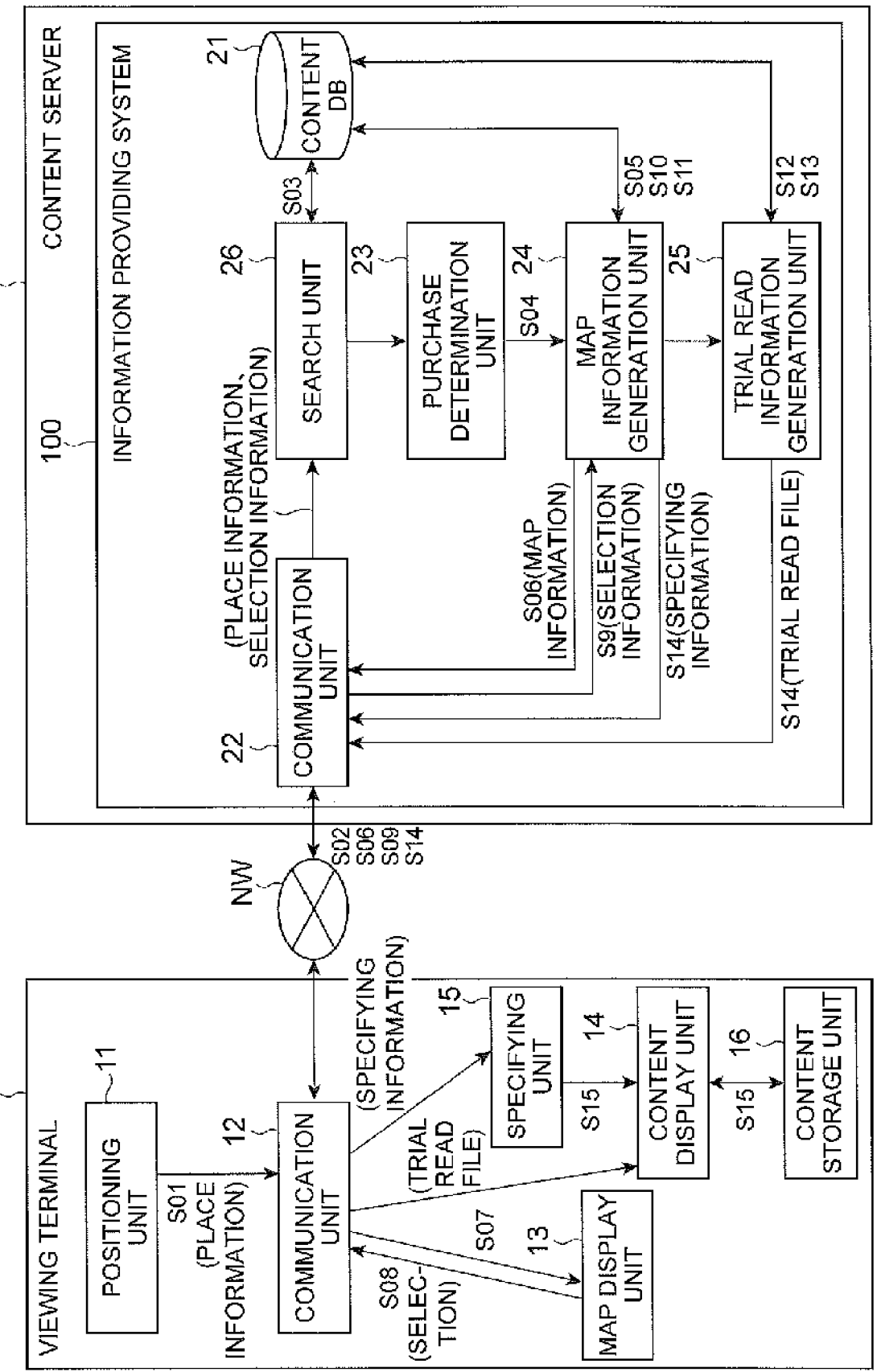
FIG. 1 is a functional diagram illustrating the functional configuration of an information providing system 100.
Figure 2:
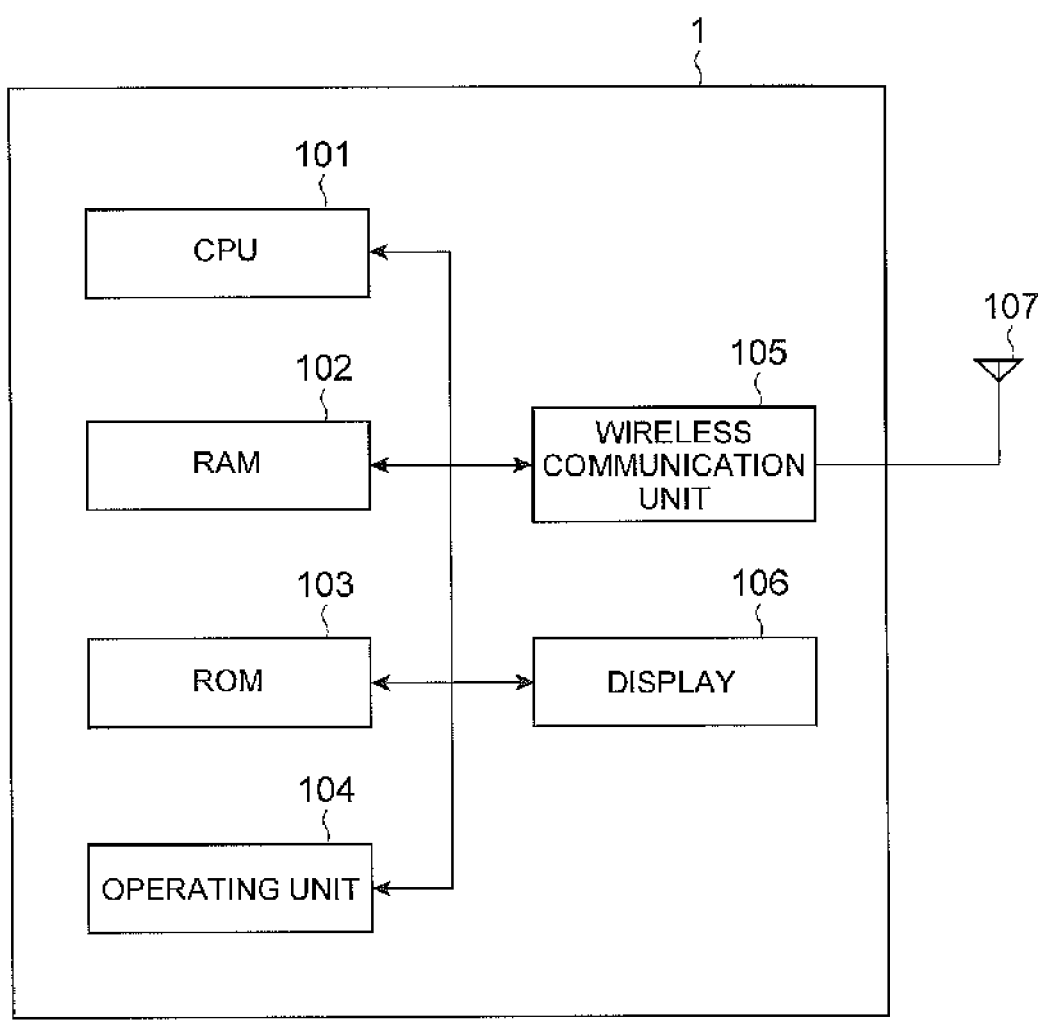
FIG. 2 is a physical diagram illustrating the physical configuration of a viewing terminal 1.
Figure 3:
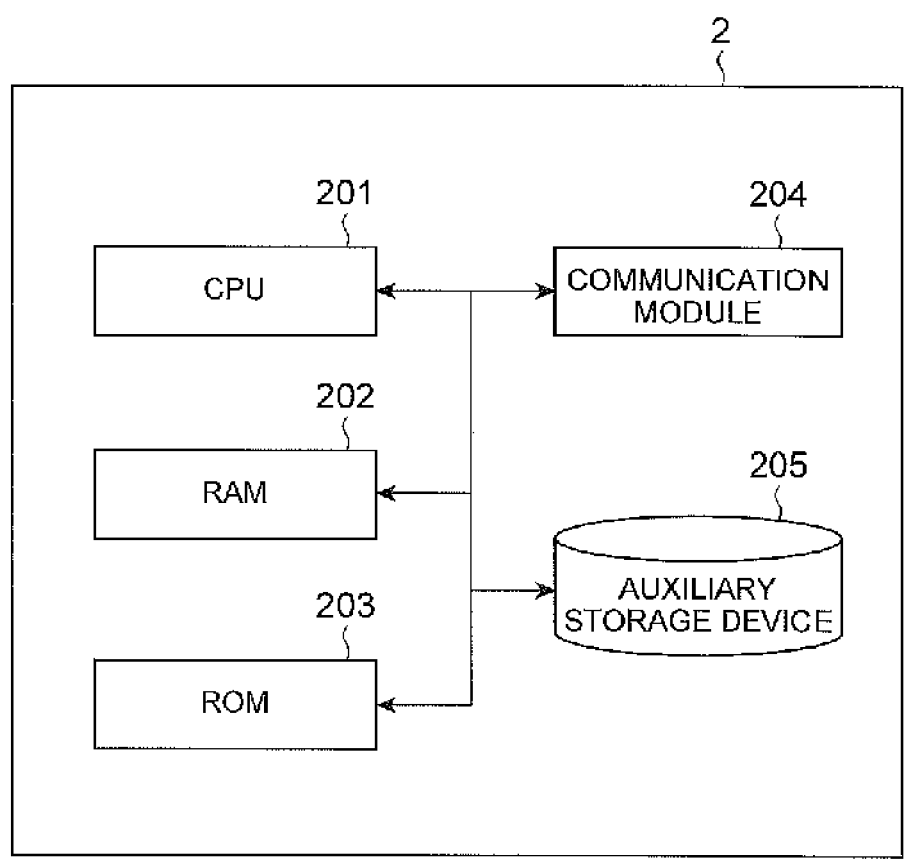
FIG. 3 is a physical diagram illustrating the physical configuration of a content server 2.

First, the configuration of an information providing system according to the present invention is described hereinafter with reference to FIGS. 1 to 3. FIG. 1 is a functional diagram illustrating the functional configurations of a content server 2 including an information providing system 100, and a viewing terminal 1 that can communicate with the content server 2. The information providing system 100 is a system that can display information related to various content such as electronic books and video content on the viewing terminal 1. FIG. 2 is a physical diagram illustrating the physical configuration of the viewing terminal 1, and FIG. 3 is a physical diagram illustrating the physical configuration of the content server 2. Note that S01, S02 and so on shown in FIG. 1 correspond to Steps S01, S02 and so on shown in FIG. 6, which is described later.

The viewing terminal 1 shown in FIG. 1 is a device with a built-in viewer such as a smartphone, a mobile phone terminal or a dedicated terminal for content viewing capable of displaying various content such as electronic books and video content. An electronic book is digital data having a function of a computerized book composed of a plurality of pages. The viewing terminal 1 can communicate with the content server 2 through a communication network NW such as a radio base station or a wired communication network. Thus, the viewing terminal 1 can measure the current position and transmit the positioning result to the content server 2. Further, in the case where there is content containing an expression related to a spot (place) near the current position, the viewing terminal 1 can receive information related to the spot (place) from the content server. Furthermore, the viewing terminal 1 can display map information where those various spots are displayed on the map in the vicinity of the current position. When one of those spots is selected, the viewing terminal 1 can receive specifying information that specifies an expression part where an expression related to the selected spot (place) appears in content and display the expression specified by the specifying information.

The content server 2 is a device such as a server or host computer that manages the above-described specifying information and the above-described content as data. For example, the content server 2 manages whether the content installed in the viewing terminal 1 is purchased by a user of the viewing terminal 1.

The configuration of the viewing terminal 1 is described next. As shown in FIG. 2, the viewing terminal 1 is configured as a computer that includes hardware such as a CPU 101 (Central Processing Unit), a RAM 102 (Random Access Memory) and a ROM 103 (Read Only Memory) serving as main storage devices, an operating unit 104 for operating the viewing terminal 1, a communication unit 105 for performing communication, a display 106 such as a touch panel display, and an antenna 107 as principal physical components. Those components operate so that the functions of the viewing terminal 1 are exerted as described below.

Further, as shown in FIG. 1, the viewing terminal 1 includes a positioning unit 11, a communication unit 12, a map display unit 13, a content display unit 14 (display means), a specifying unit 15 (specifying means), and a content storage unit 16 as principal functional components.

The positioning unit 11 is a position measurement unit that acquires place information indicating a place. The positioning unit 11 may acquire current position information indicating a current position of the viewing terminal 1 as the place information by using GPS (Global Positioning System) technology. The positioning unit 11 may acquire the place information through communication with the outside of the viewing terminal 1. Further, the place information may be the current position information indicating an address, a place name, a place or the like entered by a user's character input using an operating unit of the viewing terminal 1. Furthermore, the place information may be the current position information indicating a selected spot by a user's touch input on a map displayed on the viewing terminal 1. Note that the place information contains a user ID that identifies a user of the viewing terminal 1.

The communication unit 12 is a communication processing unit that transmits and receives various signals (information) to and from the content server 2. The communication unit 12 can transmit the above-described place information and selection information, which is described later, and the like to the content server 2. Further, the communication unit 12 can receive map information corresponding to the place information, specifying information corresponding to the selection information, a trial read file, which are described later, and the like from the content server 2. Further, the communication unit 12 can determine whether purchasing of the content indicated by the specifying information is done by a user of the viewing terminal 1 based on the received purchase information.

The map display unit 13 is a communication processing unit that acquires the above-described map information from the content server 2. The content server 2 receives the place information from the communication unit 12 and then acquires place information indicating a place within a specified range (for example, one area) from the place (for example, one spot) indicated by the place information. Note that the content server 2 stores the place information indicated by latitude and longitude, address, place name, place or the like and the above-described specifying information in association with each other. The specifying information is information that specifies an expression part where an expression related to a place appears in content. Therefore, the content server 2 can generate the above-described map information based on the acquired place information. Then, the content server 2 outputs the map information to the viewing terminal 1 so that the map information can be displayed on the viewing terminal 1. The map display unit 13 receives the map information and displays the map information where various spots are displayed superimposed on the map in the vicinity of the current position. At each spot, the title of the corresponding content is displayed in addition. When one of the various spots is selected by a user's touch input or the like, the map display unit 13 generates selection information indicating the selected spot.

The map display unit 13 transmits the generated selection information to the content server 2. The content server 2 extracts specifying information or generates a trial read file based on the acquired selection information and outputs (transmits) it to the viewing terminal 1. The trial read file is information that is set to allow viewing (previewing) of a part of the content to help consider whether to purchase the content. The viewing terminal 1 can thereby display the specifying information or the trial read file.

The specifying unit 15 is a unit that, when purchasing of the content indicated by the specifying information is done by a user of the viewing terminal 1, specifies an expression part specified by the specifying information in the corresponding content stored in the content storage unit 16. The content display unit 14 displays the expression part specified for the corresponding content. For example, the content display unit 14 displays the first page of the specified expression part.

On the other hand, when it is determined that purchasing of the content indicated by the specifying information is not done by a user of the viewing terminal 1, the specifying unit 15 outputs the trial read file received by the communication unit 12 to the content display unit 14. At least part of the expression part specified by the specifying information is thereby displayed on the content display unit 14.

The content display unit 14 is a display control unit that displays at least part of the expression part specified by the specifying information which corresponds to one spot in the map information acquired by the map display unit 13 on the viewing terminal 1. Note that the content display unit 14 may display the trial read file instead of the expression part specified by the specifying information. The content display unit 14 displays at least part of the expression part specified by the specifying information. Note that, in the case where the content is an electronic book, the expression part specified by the specifying information may be a sentence where the selected spot is described in the electronic book. The expression part, however, is not limited thereto, and it may be any expression related to a place as described later.

Note that the expression part specified by the specifying information is information indicating the actual expression (description) in the expression part indicated by the specifying information, and it is acquired from the content storage unit 16. Further, the content display unit 14 may display the trial read file received by the communication unit 12.

The content storage unit 16 is a storage unit that stores the content for which purchasing is done by a user of the viewing terminal 1. A part of the content stored in the content storage unit 16 which corresponds to the expression part specified by the specifying information is acquired by the specifying unit 15.

The configuration of the content server 2 is described hereinafter. As shown in FIG. 3, the content server is configured as a computer that includes hardware such as a CPU 201, a RAM 202 and a ROM 203, a communication module 204 for performing communication and an auxiliary storage device 205 such as a hard disk as principal physical components. Those components operate so that the functions of the content server 2 are exerted as described below.

Further, the content server 2 includes a content database 21, (storage means), a communication unit 22 (acquisition means, output means), a purchase determination unit 23 (determination means), a map information generation unit 24, a trial read information generation unit 25 (generation means), and a search unit 26 (search means).

The content database 21 is a database that stores place information indicating a specific place such as latitude and longitude, address, place name or place and the above-described specifying information in association with each other. A target of the expression part specified by the specifying information is a place where an important scene or a famous scene of a novel has taken place, for example. Further, a target of the expression part specified by the specifying information may be a place where a historical event is considered to have occurred, though it is uncertain, in a fiction based on history. Furthermore, a target of the expression part specified by the specifying information may be a place described in an essay, a guidebook or the like.

FIG. 4 shows one example of a table structure of the content database 21. As shown in FIG. 4, items stored in the content database 21 include a registration number that can uniquely identify a combination of specifying information and place information, the title of content, specifying information (information that specifies a part where an expression related to a place appears in the content; from row Q in page P to row S to page R for an electronic book, from T minutes to U minutes for video content), a scene name (e.g. "battle scene between AA and BB"), registration place information as place information (latitude and longitude information, geo-tag information), a place name as place information (e.g. "Sekigahara") and the like. The specifying information may be registered into the content database 21 by an author or creator of the content or may be registered by a user. Further, the content database 21 may store data of the actual content corresponding to the specifying information and genre information of the content in association with each other. Further, a purchase history of a user associated with each user ID may be stored in the content server 2 or stored in another server.

The communication unit 22 is a communication processing unit that transmits and receives various signals (information) to and from the viewing terminal 1 as shown in FIG. 1. The communication unit 22 can receive (acquire) place information from the viewing terminal 1. Further, the communication unit 12 can receive map information corresponding to the place information from the map information generation unit 24 and transmit it to the viewing terminal 1. Furthermore, the communication unit 22 can receive selection information from the viewing terminal 1. Further, the communication unit 12 can receive specifying information corresponding to the selection information from the map information generation unit 24 and transmit it to the viewing terminal 1. Further, the communication unit 12 can receive a trial read file corresponding to the selection information from the trial read information generation unit 25 and transmit it to the viewing terminal 1.

The search unit 26 is a search processing unit that acquires, from the content database 21, the specifying information that is stored in association with place information indicating a place existing within a specified range (e.g. an area with a specified radius) from a place (e.g. one spot) indicated by the place information acquired by the communication unit 22. After acquiring the specifying information from the content database 21, the search unit 26 transmits it to the map information generation unit 24.

Note that the search unit 26 can specify whether an appearance percentage on the basis of an appearance history of the place indicated by the place information acquired by the communication unit 22 is less than a specified percentage or not. A place where the appearance percentage is less than a specified percentage is likely to be a place where the place information is not usually acquired, and it is a place such as a business trip or travel destination, for example. The search unit 26 can acquire, from the content database 21, the specifying information that is stored in association with the place indicated by the place information where the appearance percentage is less than a specified percentage and that relates to the content belonging to a specific genre (e.g. travel guide). Note that the appearance history may be stored in association with a user ID in the content server 2 or stored in another server.

Further, the search unit 26 can acquire, from the content database 21, the specifying information that is stored in association with the place indicated by the above-described place information and that is in the content which is determined that the above-described purchasing is done. As a result, it is possible to display the specifying information related to the already purchased content to a user who is considered to be in the place such as a business trip or travel destination as described above.

Further, the search unit 26 can specify whether an appearance percentage on the basis of an appearance history of the place indicated by the place information acquired by the communication unit 22 is equal to or more than a specified percentage or not. A place where the appearance percentage is equal to or more than a specified percentage is likely to be a place within the field of everyday activities where the place information is usually acquired. The search unit 26 can acquire, from the content database 21, the specifying information that is stored in association with the place indicated by the place information where the appearance percentage is equal to or more than a specified percentage and that relates to the content which is determined that purchasing is not done. As a result, it is possible to create a trial read file related to the content that is not yet purchased and considered to be unknown by a user who is familiar with the field of everyday activities and displays it on the viewing terminal 1.

The purchase determination unit 23 is a determination processing unit that determines whether purchasing of the content searched by the search unit 26 is done or not. The purchase determination unit 23 uses a user ID contained in the place information transmitted from the communication unit 12 and generates purchase information indicating whether purchasing is done by a user of the user ID. The purchase determination unit 23 determines whether the purchasing is done or not by accessing the content database 21. The purchase information generated as a result of the determination is contained in the above-described map information and transmitted to the viewing terminal 1 by the communication unit 22.

When place information included in a specified range from the place indicated by the place information exists in the content database 21, the map information generation unit 24 extracts registration data corresponding to the place information as a result of searching.

Next, the map information generation unit 24 acquires purchase information for the content specified by the registration data from the purchase determination unit 23. Then, the map information generation unit 24 generates map information where various spots indicated by the registration data are displayed superimposed on the map in the vicinity of the current position indicated by the place information. The purchase information is contained in the map information. Note that the map information is transmitted to the viewing terminal 1 by the communication unit 22. The registration data acquired by the map information generation unit 24 is thereby output so that it can be displayed as the map information on the viewing terminal 1.

Further, the map information generation unit 24 generates specifying information based on the selection information received by the communication unit 22. To be more specific, the map information generation unit 24 first acquires purchase information for the content specified by the selection information from the purchase determination unit 23. When purchasing of the content is done, the map information generation unit 24 extracts the specifying information corresponding to the spot selected by the selection information. The specifying information is thereby generated. Note that the specifying information is transmitted to the viewing terminal 1 by the communication unit 22.

The trial read information generation unit 25 is a setting processing unit that sets a trial read range where the spot selected by the selection information appears in the case where purchasing of the content specified by the specifying selection information is not done. The trial read range is a range that is set to allow viewing (previewing) of the content to help consider whether to purchase the content, and it includes at least part of the expression part described above.

Further, in the case where the content is an electronic book and the expression part specified by the specifying information is information of equal to or less than a specified number of rows (several rows), the trial read information generation unit 25 sets the trial read range so as to contain the expression part and not to exceed a specified number of pages. Further, in the case where the content is an electronic book and the expression part specified by the specifying information is information of more then a specified number of pages, the trial read information generation unit 25 sets the trial read range so as not to exceed the specified number of pages. The range that can be set as the trial read range may be defined in advance by an author or creator of the content, a publisher or the like.

The trial read information generation unit 25 then creates a trial read file based on the trial read range. Note that the trial read file is transmitted to the viewing terminal 1 by the communication unit 22. At least part of the above-described expression part indicated by the trial read file acquired by the trial read information generation unit 25 is thereby output so that it can be displayed on the viewing terminal 1.

<2> Description of Presentation by Information Providing System

The description of presentation by the information providing system 100 is described hereinafter with reference to FIG. 5. FIG. 5 is a screen schematic diagram illustrating one example of the way of changing from display of map information to display of an expression part specified by specifying information in the viewing terminal 1. Note that the viewing terminal 1 has a display D.

First, the viewing terminal 1 transmits place information obtained by measuring the current position or the like to the content server 2. Then, the viewing terminal 1 receives map information related to various spots that are close to the current position and appear in the various content described above. The viewing terminal 1 thereby displays the map information where the various spots (three spots indicated by the white circles) are displayed on the map in the vicinity of the current position (the spot indicated by the black circle) as shown in FIG. 5(*a*). At each of the three spots, the title of content ("title A", "title B" and "title C") is displayed in addition. Note that characters or a mark indicating whether purchasing by a user of the viewing terminal 1 is done may be displayed for each of the titles.

It is assumed that the spot with "title A" (the spot indicated by the white circle), which is one of the various spots, is selected by a user's touch input or the like, and selection information is created. In this case, as shown in FIG. 5(*b*), an expression part S specified by specifying information is displayed for the content (electronic book) with the title A.

<3> Sequence of Process Performed by Information Providing System 100

Figure 6:
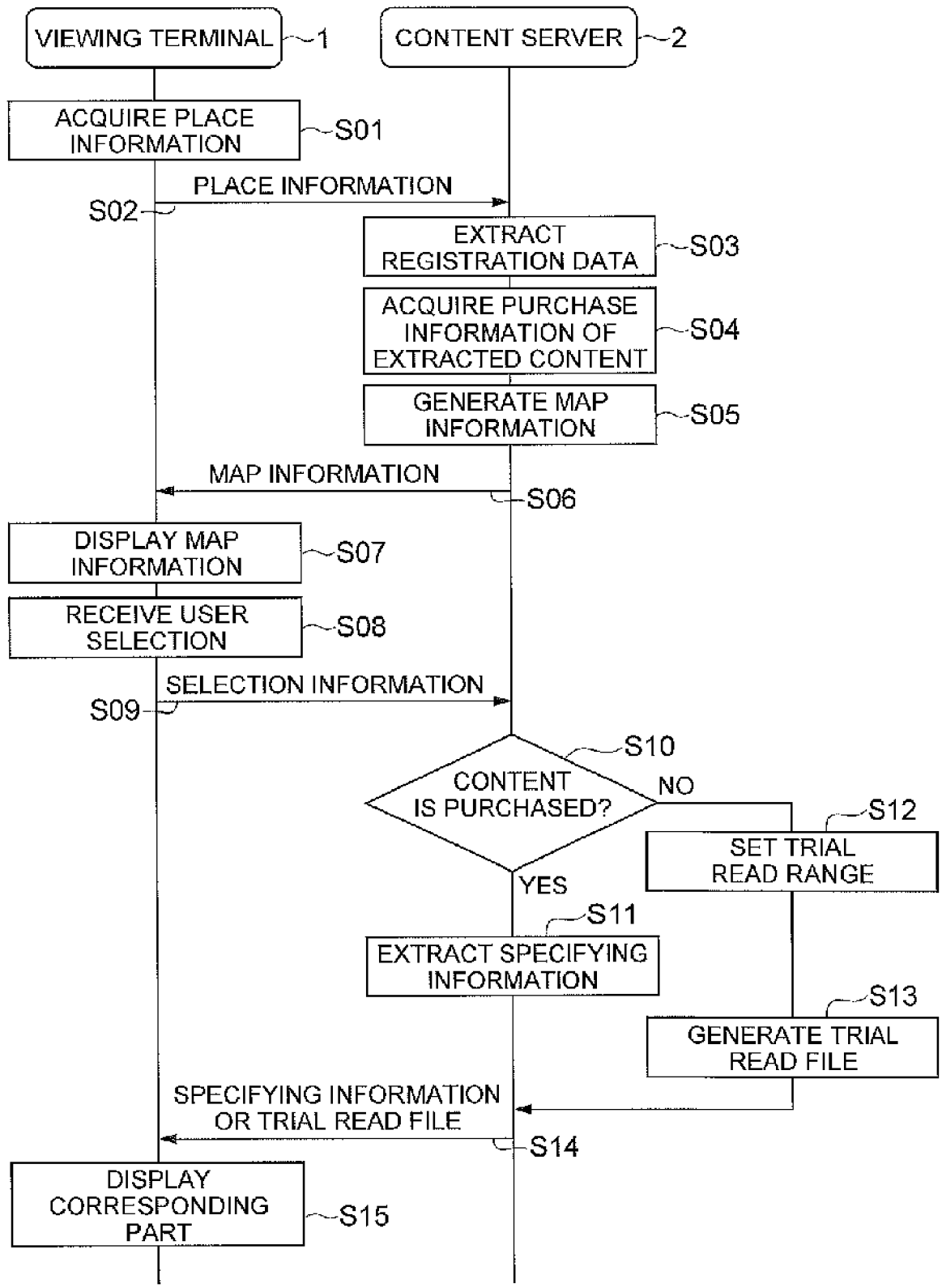
FIG. 6 is a flowchart illustrating the flow of a sequence of a process performed by the information providing system 100.

An example of a sequence of a process (information providing method) performed by the information providing system 100 is described hereinafter with reference to FIG. 6. FIG. 6 is a flowchart illustrating the flow of a sequence of a process performed by the viewing terminal 1 and the content server 2.

First, the positioning unit 11 acquires place information input to the viewing terminal 1 in relation to a place (Step S01). The communication unit 12 then transmits the place information to the content server 2, and the communication unit 22 receives the place information from the viewing terminal 1 (Step S02, acquisition step).

Next, the map information generation unit 24 extracts registration data corresponding to each of place information included in a specified range from the place indicated by the place information as a result of searching (Step S03, search step). The map information generation unit 24 then acquires purchase information about content specified by the registration data from the purchase determination unit 23 (Step S04). Then, the map information generation unit 24 generates map information where various spots indicated by the registration data are superimposed on the map in the vicinity of the current position indicated by the place information (Step S05). The map information contains the purchase information. The map information is then transmitted to the viewing terminal 1 by the communication unit 22 (Step S06). The registration data acquired by the map information generation unit 24 can be thereby displayed as the map information on the viewing terminal 1 (Step S07).

After that, when one of the various spots is selected by a user's touch input or the like, the selection is accepted, and the map display unit 13 generates selection information indicating the selected spot (Step S08). The selection information is transmitted to the content server 2 by the communication unit 22 (Step S09). Then, the map information generation unit 24 acquires purchase information for the content specified by the selection information from the purchase determination unit 23. The map information generation unit 24 then determines whether purchasing of the content is done or not (Step S10). When purchasing of the content is done, the process proceeds to Step S11, which is described later. On the other hand, when purchasing of the content is not done, the process proceeds to Step S12, which is described later.

In Step S11, the map information generation unit 24 extracts specifying information where the spot selected by the selection information appears. The specifying information is thereby generated. The process then proceeds to Step S14, which is described later (output step).

In Step S12, the map information generation unit 24 sets a trial read range where the spot selected by the selection information appears. The trial read range is a range that is set to allow viewing (previewing) of the content to help consider whether to purchase the content. The map information generation unit 24 then generates a trial read file based on the trial read range (Step S13).

In Step S14, the communication unit 22 transmits the specifying information or the trial read file to the viewing terminal 1 (output step). In the viewing terminal 1, when purchasing of the content is done, an expression part specified by the specifying information is displayed (Step S15). On the other hand, when purchasing of the content is not done, the content display unit 14 displays the received trial read file (Step S15). In the case where the content is an electronic book, it is displayed on the viewing terminal 1 in the state where a relevant page which is the expression part corresponding to the specifying information is opened. In the case where the content is a video, it is displayed on the viewing terminal 1 in the state where the video is played from a relevant scene which is the expression part corresponding to the specifying information.

Note that the place information may be acquired and transmitted to the content server 2 at regular intervals during the period when an application for implementing the above function is running in the viewing terminal 1. In this case, in the content server 2, the map information is generated and transmitted to the viewing terminal 1 when the registration data is extracted.

<4> Module Configuration of Information Providing Program

Figure 7:
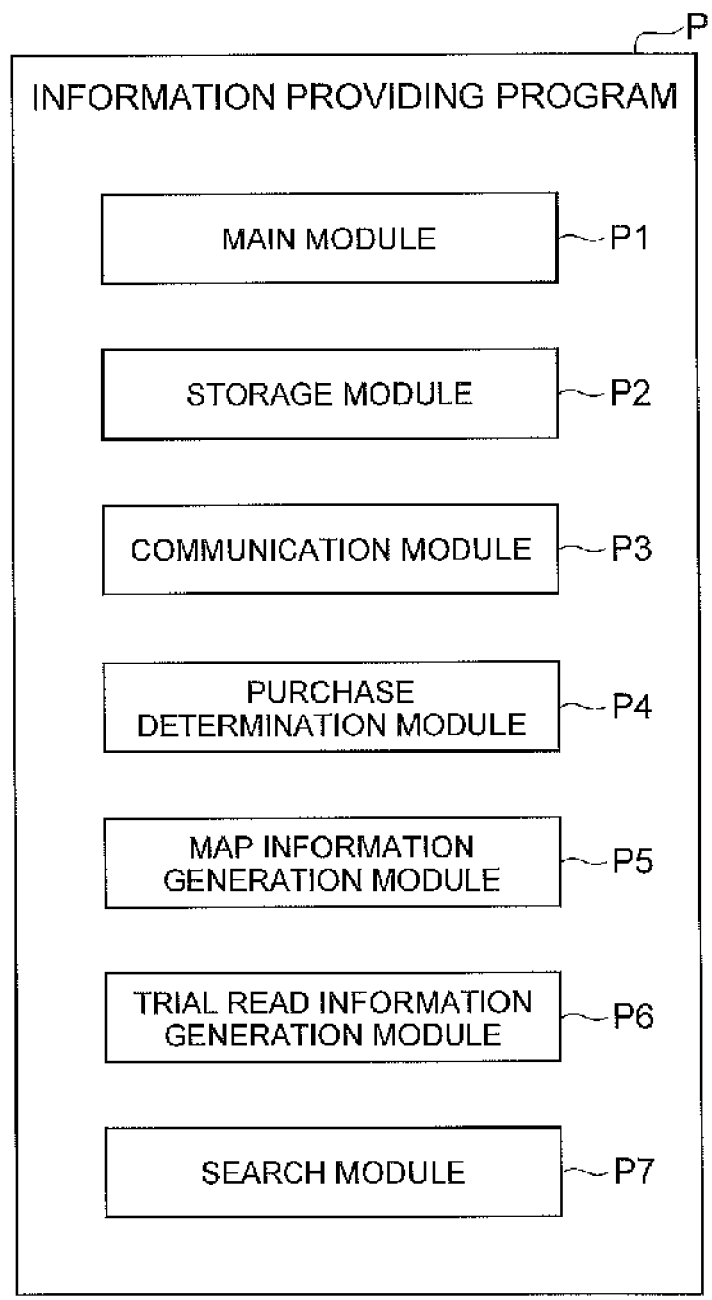
FIG. 7 is a module diagram illustrating the module configuration of an information providing program P that causes a computer to function as the content server 2.

The module configuration of an information providing program that causes a computer to function as the information providing system 100 is described hereinafter with reference to FIG. 7. FIG. 7 is a module diagram illustrating the module configuration of an information providing program P that causes a computer to function as the information providing system 100.

As shown in FIG. 7, the information providing program P includes a main module P1, a storage module P2, a communication module P3, a purchase determination module P4, a map information generation module P5, a trial read information generation module P6, and a search module P7.

The main module P1 is a part that exercises control over the function of executing processing of various information. The above-described functions of the viewing terminal 1 are implemented by executing the main module P1.

Further, the functions implemented by executing the storage module P2, the communication module P3, the purchase determination module P4, the map information generation module P5, the trial read information generation module P6 and the search module P7 are equal to the functions of the content database 21, the communication unit 22, the purchase determination unit 23, the map information generation unit 24, the trial read information generation unit 25 and the search unit 26, respectively. Note that, at the point of time when the information providing program P2 is installed into a computer, the data is not necessarily contained in the content database 21.

The information providing program P is provided in the form of being recorded in a static manner on a recording medium such as CD-ROM or DVD-ROM or semiconductor memory, for example. Further, the information providing P may be provided as a computer data signal superimposed onto a carrier wave over a communication network.

<5> Functions and Effects of the Present Invention

According to the information providing system 100, place information indicating a place is acquired first, and specifying information that is stored in association with place information indicating a place within a specified range from the acquired place information is acquired from the content database 21. Then, the specifying information that specifies an expression part where an expression related to the place appears in the content is output. It is thereby possible to easily find the part where the expression appears in the content that contains the expression related to the place.

For example, if there is a famous scene in connection with a specific place name in an unread book, many people are likely to want to read the corresponding part of the book immediately. According to the information providing system 100, it is possible to clearly present how a place such as a specific place name that relates to a user of the viewing terminal 1 appears in the content such as a book.

Further, according to the information providing system 100, it is determined whether purchasing of the content is done by a user of the viewing terminal 1, and when it is determined that purchasing of the content is done, specifying information is transmitted to the viewing terminal 1. It is thereby possible to transmit the specifying information to the viewing terminal 1 when purchasing of the content is done. As a result, the viewing terminal 1 can specify the corresponding part of the purchased content based on the specifying information and display it.

Further, according to the information providing system 100, a trial read file that contains at least part of an expression part specified by specifying information is generated, and when it is determined that purchasing of the content is not done, the trial read file is transmitted to the viewing terminal 1. It is thereby possible to transmit the trial read file to the viewing terminal 1 and display it when purchasing of the content is not done.

Further, according to the information providing system 100, specifying information that is stored in association with a place indicated by place information where an appearance percentage on the basis of an appearance history of the place indicated by the acquired place information is less than a specified percentage and that relates to the content belonging to a specific genre (e.g. travel guide) is acquired. A place where the appearance percentage is less than a specified percentage is likely to be a place where the place information is not usually acquired, and it is considered to be a place such as a business trip or travel destination. In such a case, the specifying information in the content belonging to a specific genre (e.g. travel guide) that is suitable for a place such as a business trip or travel destination, for example, is acquired. As a result, it is possible to display the specifying information suitable for a user that is considered to be in a place such as a business trip or travel destination.

Further, according to the information providing system 100, specifying information that is stored in association with a place indicated by place information where an appearance percentage on the basis of an appearance history of the place indicated by the acquired place information is less than a specified percentage and that relates to the content determined to be already purchased is acquired. A place where the appearance percentage is less than a specified percentage is likely to be a place where the place information is not usually acquired, and it is considered to be a place such as a business trip or travel destination. In such a case, the specifying information in the content that is determined to be already purchased is acquired. As a result, it is possible to display the specifying information suitable in the purchased content for a user that is considered to be in a place such as a business trip or travel destination.

Further, according to the information providing system 100, specifying information that is stored in association with a place indicated by place information where an appearance percentage on the basis of an appearance history of the place indicated by the acquired place information is equal to or more than a specified percentage and that relates to the content determined to be not purchased is acquired. A place where the appearance percentage is equal to or more than a specified percentage is likely to be a place within the field of everyday activities where the place information is usually acquired. In such a case, the specifying information in the content that is determined to be not purchased is acquired. As a result, it is possible to display the specifying information suitable in the content that is not yet purchased and considered to be unknown by a user for the user who is familiar with the field of everyday activities.

Further, according to the information providing system 100, place information indicating a place is acquired first, and specifying information that is stored in association with place information indicating a place within a specified range from the acquired place information is acquired from the content database 21. Then, at least part of an expression part where an expression related to the place appears in the content which is acquired from the content storage unit 16 is output. It is thereby possible to easily find the part where the expression appears in the content that contains the expression related to the place.

Further, according to the viewing terminal 1, an expression part in the content stored in the content storage unit 16 is specified based on the specifying information output from the communication unit 22 included in the information providing system 100, and the specified expression part in the content can be displayed.

<6> Alternative Examples

The trial read information generation unit 25 may be configured to be able to generate an encrypted content file. It is assumed that purchasing of the content related to one of various spots in map information selected by a user's touch input or the like is not done. In this case, the communication unit 22 transmits a trial read file to the viewing terminal 1 and then transmits a content file generated by the trial read information generation unit 25 to the viewing terminal. At this time, it is preferred that the content server 2 acquires a signal indicating that displaying of the trial read file is done in the viewing terminal 1 and then the communication unit 22 transmits the content file to the viewing terminal 1. The content file is thereby downloaded in the viewing terminal 1, and it is thereby possible to prevent a delay of the display process in the viewing terminal 1.

In the case where the above configuration is employed, the content file is encrypted and cannot be read by a user using the terminal. After purchasing of the content file is done by a user of the viewing terminal 1, a decryption key is transmitted from the content server 2 to the viewing terminal 1. The content file is thereby decrypted in the viewing terminal 1. Then, the restrictions on the viewing of the content file are released. The user of the viewing terminal 1 thereby becomes able to view the whole part of the purchased content (the full text for an electronic book). Note that, if a specified period of time has elapsed without purchasing of the content file by a user of the viewing terminal 1, the content file is automatically deleted from the viewing terminal 1.

Specifically, in the case where the above configuration is employed, the content file where restrictions are imposed on the viewing of the part other than the part contained in the trial read file is generated first. Then, after the trial read file is transmitted, the content file is transmitted to the viewing terminal 1. After purchasing of the content file is done, the restrictions on the viewing of the content file are released. It is thereby possible to generate the content file and transmit it to the viewing terminal 1 and, after the content file is purchased, release the restrictions on the viewing of the content file.

Further, in the case where a user selects a plurality of spots on the map information, a plurality of selection information is received by the communication unit 22, and the map information generation unit 24 may be configured to display a plurality of expression parts specified by a plurality of specifying information respectively corresponding to the plurality of selection information in combination. In the example using this configuration, each of a plurality of expression parts specified by a plurality of specifying information are displayed in combination regardless of whether they are related to a plurality of different content or related to one content.

Further, the map information generation unit 24 may abstract (extract) the expression parts specified by the plurality of specifying information and display them in combination. Note that the abstract may be made on the basis of a chapter including the expression part specified by the specifying information as a "good place to stop". Further, "bookmark" icon may be displayed for the abstracted part to allow easy display of the abstracted part.

Further, the map information generation unit 24 may abstract (extract) the expression parts specified by the plurality of specifying information after editing and then display them in combination. Note that user registration may be made for the expression parts specified by the specifying information. In this case, overlap can occur between the expression parts specified by the specifying information. When the overlap occurs, the map information generation unit 24 selects and extracts the expression part specified by any one specifying information and then outputs it.

In the case where the above configuration is employed, when a plurality of specifying information is acquired, a plurality of expression parts specified by the plurality of specifying information are output in such a way that they are displayed in combination. A user can thereby view the combined plurality of expression parts all together.

Figure 8:
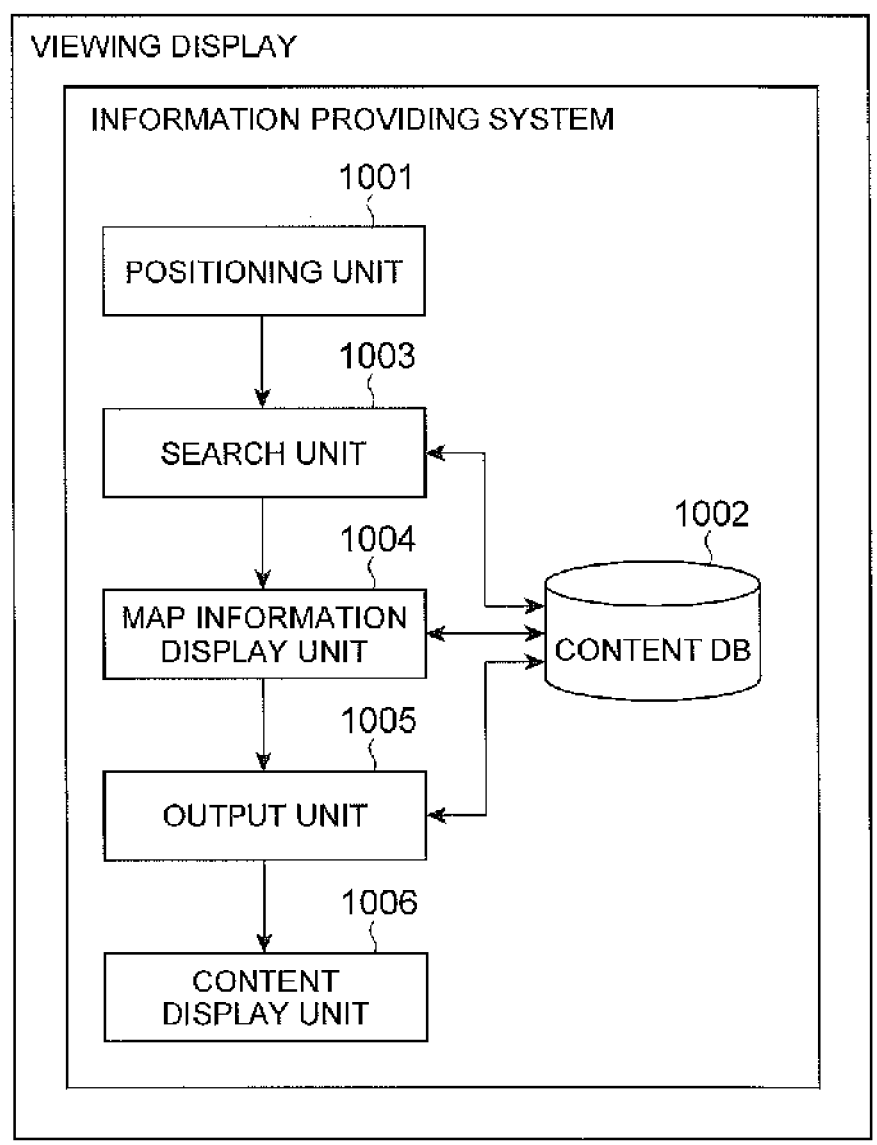
FIG. 8 is a functional diagram illustrating the functional configuration of a viewing terminal as the information providing system 100.

Further, in the above-described embodiment, the information providing system 100 is composed of the content database 21, the communication unit 22, the purchase determination unit 23, the map information generation unit 24, the trial read information generation unit 25 and the search unit 26 as shown in FIG. 1. However, the arrangement of the components of the information providing system 100 is not particularly limited, and the information providing system 100 may be incorporated into a viewing terminal as shown in FIG. 8, for example. In this case, the viewing terminal includes a positioning unit 1001 (acquisition means), a content database 1002 (equivalent to the function of the content database 21; storage means), a search unit 1003 (equivalent to the function of the search unit 26; search means), a map information display unit 1004 (equivalent to the function of the map information generation unit 24), an output unit 1005 (output means), and a content display unit 1006 (equivalent to the function of the communication unit 22).

Figure 9:
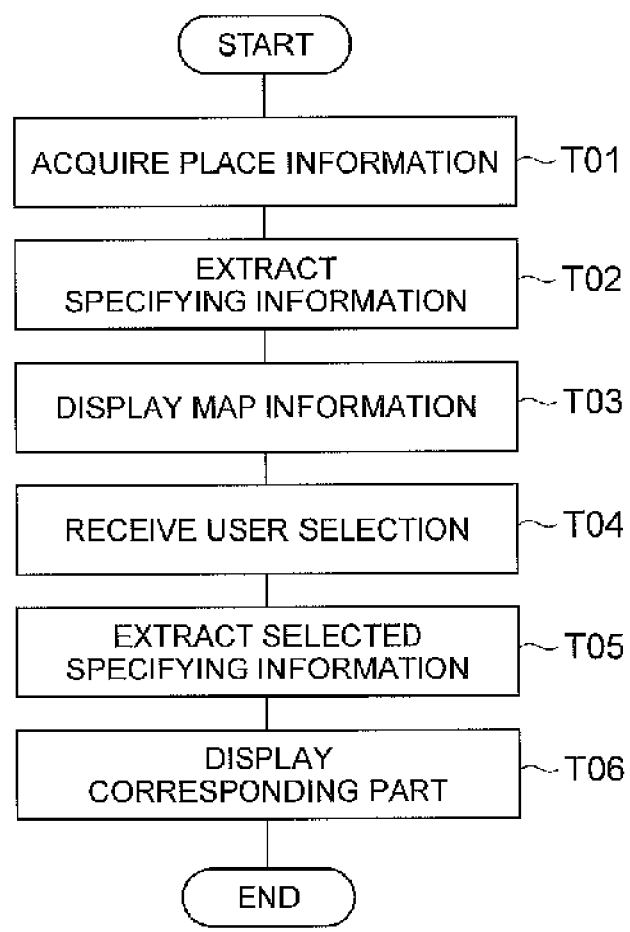
FIG. 9 is a flowchart illustrating the flow of a sequence of a process performed by the viewing terminal 1 as the information providing system 100.

One example of a sequence of a process (information providing method) performed by the information providing system having the above configuration is described hereinafter with reference to FIG. 9. FIG. 9 is a flowchart illustrating the flow of the process. Note that the viewing terminal in this configuration is a stand-alone terminal that performs local processing without communication with the outside such as the content server. Further, in the viewing terminal in this configuration, only the content for which purchasing is done is processed. Accordingly, the specifying information or the like is stored in the content DB 1002 for the content for which purchasing is done by a user.

First, the positioning unit 1001 of the viewing terminal 1 acquires place information indicating a place (Step T01, acquisition step). The positioning unit 1001 may acquire current position information indicating a current position of the viewing terminal 1 as the place information by using GPS technology. The positioning unit 1001 may acquire current position information indicating an address, a place name, a place or the like entered by a user's character input using an operating unit of the viewing terminal 1 as the place information. Then, the search unit 1003 of the viewing terminal 1 extracts specifying information that is stored in association with place information indicating a place within a specified range from the place indicated by the acquired information from the content database 1002 (Step T02, search step). Then, the map information display unit 1004 of the viewing terminal 1 generates and displays map information where various spots indicated by the specifying information are superimposed on the map in the vicinity of the current position indicated by the place information (Step T03).

After that, when one of the various spots is selected by a user's touch input or the like, the selection is accepted, and the map information display unit 1004 of the viewing terminal 1 generates selection information indicating the selected spot (Step T04). The map information generation unit 24 of the viewing terminal 1 then extracts the specifying information where the spot selected by the selection information appears (Step T05). The specifying information is thereby generated. After that, the content display unit 14 of the viewing terminal 1 outputs and displays the expression part corresponding to the specifying information on the viewing terminal 1 (Step T06; output step). The process thereby ends and is repeated from Step T01.

Further, in the above-described embodiment, the various processing is performed when the place information input in relation to a place is acquired by the positioning unit 11 as shown in FIG. 6. However, the timing to acquire the place information is not particularly limited, and application software for performing positioning at specified time intervals may be running at all times in the viewing terminal 1, and the various processing may be performed each time a positioning result obtained by the software is acquired by the positioning unit 11. In this case, it is possible to display the map information automatically in a destination of a user at specified time intervals without need for a user operation on the viewing terminal (i.e. output display by push delivery to the viewing terminal 1 at specified time intervals).

Further, the map information generation unit 24 may be configured to transmit link information (specifying information) that allows access to a site that displays an expression part specified by specifying information to the viewing terminal 1 through the communication unit 22. When a user performs an operation such as selecting the link information displayed on the viewing terminal 1 and accesses the site, the expression part specified by the specifying information is displayed on the viewing terminal 1 by the content display unit 14.

Further, the map information generation unit 24 may transmit actual specifying information to the viewing terminal 1, so that the actual specifying information is displayed on the viewing terminal 1. It is assumed that a user of the viewing terminal 1 has a printed material (e.g. an actually published book) of the content corresponding to the displayed specifying information at hand. In this case, the user can easily find the expression part corresponding to the place information by opening the corresponding page of the printed material which is specified by the specifying information.

Finally, the module configuration of an information providing program in the case where the information providing system 100 is included in the viewing terminal is described. The information providing program in this case includes a main module, a positioning module, a content database module, a search module, a map information display module, an output module, and a content display module.

The main module is a part that exercises control over the function of executing processing of various information. The above-described functions of the viewing terminal incorporating the information providing system 100 are implemented by executing the main module.

Further, the functions implemented by executing the positioning module, the content database module, the search module, the map information display module, the output module and the content display module are equal to the functions of the positioning unit 1001 (acquisition means), the content database 1002 (equivalent to the function of the content database 21; storage means), the search unit 1003 (equivalent to the function of the search unit 26; search means), the map information display unit 1004 (equivalent to the function of the map information generation unit 24), the output unit 1005 (output means) and the content display unit 1006 (equivalent to the function of the communication unit 22), respectively. Note that, at the point of time when the information providing program in this case is installed into a computer, the data is not necessarily contained in the content database 1002.

The information providing program in this case is provided in the form of being recorded in a static manner on a recording medium such as CD-ROM or DVD-ROM or semiconductor memory, for example. Further, the information providing program in this case may be provided as a computer data signal superimposed onto a carrier wave over a communication network.

INDUSTRIAL APPLICABILITY

According to the present invention, it is possible to clearly present how a place that relates to a user appears in content such as a book.

REFERENCE SIGNS LIST

1 . . . viewing terminal, 2 . . . content server, 11 . . . positioning unit, 12 . . . communication unit, 13 . . . map display unit, 14 . . . content display unit, 15 . . . specifying unit, 16 . . . content storage unit, 21 . . . content database, 22 . . . communication unit, 23 . . . purchase determination unit, 24 . . . map information generation unit, 25 . . . trial read information generation unit, 26 . . . search unit, 100 . . . information providing system, 1001 . . . positioning unit, 1002 . . . content database, 1003 . . . search unit, 1004 . . . map information display unit, 1005 . . . output unit, 1006 . . . content display unit, D . . . display, NW . . . communication network, P . . . information providing program, S . . . expression part

The invention claimed is:

1. An information providing system capable of communicating with a viewing terminal comprising:
  at least one memory configured to store computer program code; and
  at least one processor configured to access said at least one memory, read said computer program code, and operate as instructed by said computer program code, said computer program code including:
   acquisition code configured to cause at least one of said at least one processor to acquire a user ID identifying a user of the viewing terminal and place information indicating a place specified by the user of the viewing terminal;

search code configured to cause at least one of said at least one processor to:

acquire, from a first storage configured to store place information indicating a place and specifying information specifying an expression part where an expression related to the place appears in content in association with each other, the specifying information based on the place indicated by the acquired place information, wherein a whole version of the content is available for purchase from the information providing system, and acquire, from the first storage, the specifying information relating to content which has not been purchased, wherein the specifying information is stored in association with a place indicated by place information, wherein an appearance percentage based on an appearance history of the place indicated by the place information acquired by the acquisition code is equal to or more than a specified percentage;

determination code configured to cause at least one of said at least one processor to determine whether the user identified by the acquired user ID has previously purchased the content corresponding to the acquired specifying information from a second storage configured to store information identifying content purchased by the user;

generation code configured to cause at least one of said at least one processor to generate a trial read file that includes the at least one portion within the content corresponding to the acquired specifying information; and output code configured to cause at least one of said at least one processor to transmit the acquired specifying information to the viewing terminal when the determination code determines that the user has previously purchased the content corresponding to the acquired specifying information, and to transmit the trial read file to the viewing terminal when the determination code determines that the user has not previously purchased the content corresponding to the acquired specifying information.

2. The information providing system according to claim 1, wherein the generation code is further configured to cause at least one of said at least one processor to generate an encrypted content file, and the output code is further configured to cause at least one of said at least one processor to transmit:

the content file generated by the generation code to the viewing terminal after transmitting the trial read file, and information for decrypting the encrypted content file, after purchasing of the content file is done.

3. The information providing system according to claim 1, wherein when a plurality of specifying information is acquired by the search code, the output code is further configured to cause at least one of said at least one processor to output content combined with a plurality of expression parts specified by the plurality of specifying information in such a way the content can be displayed.

4. The information providing system according to claim 1, wherein the search code is further configured to cause at least one of said at least one processor to acquire, from the first storage, the specifying information relating to content belonging to a specific genre and stored in association with a place indicated by place information where an appearance percentage based on an appearance history of the place indicated by the place information acquired by the acquisition code is less than a specified percentage.

5. The information providing system according to claim 1, wherein the search code is further configured to cause at least one of said at least one processor to acquire, from the first storage, the specifying information relating to content determined that the purchasing of the content is done and stored in association with a place indicated by place information, wherein an appearance percentage based on an appearance history of the place indicated by the place information acquired by the acquisition code is less than a specified percentage.

6. The information providing system according to claim 1, wherein the first storage is configured to store data corresponding to a plurality of associations between a plurality of content and a plurality of places, and the data corresponding to each of the plurality of associations includes an identification of one of the plurality of places, an identification of at least one of the plurality of content that includes information related to the place, specifying information that specifies at least one second portion within the identified content that is related to the place and information indicating the place, and wherein the at least one of the plurality of content is a work of an author or creator.

7. The information providing system according to claim 1, wherein the program code further comprises:

map information generating code configured to cause at least one of said at least one processor to generate map information indicating a positional relationship between a first place identified by the acquired place information and a second place identified by place information associated with the acquired specifying information, wherein the search code is further configured to cause at least one of the at least one processor to acquire, from the first storage, the specifying information associated with the place information indicating the second place located within a specified range from the first place, the first storage being further configured to store a title of content in association with the place information and the specifying information, the map information further indicates the title of content associated with the acquired specifying information in association with the second place, the output code is further configured to cause at least one of the at least one processor to transmit the map information to the viewing terminal, the acquisition code is further configured to cause at least one of the at least one processor to receive selection information representing a selection of the second place by the user of the viewing terminal after the map information is transmitted, and the output code is further configured to cause at least one of the at least one processor to transmit the acquired specifying information or the trial read file corresponding to the selected second place to the viewing terminal in response to receiving the selection information.

8. The information providing system of claim 1, wherein:
the content is an electronic book,
the electronic book includes digital data, and
the electronic book has a function of a computerized book composed of a plurality of pages.

9. The information providing system of claim 8, wherein the electronic book includes a famous scene of a novel, and wherein the famous scene is associated with a specific place name.

10. The information providing system of claim 1, wherein the content is a video work by an author.

11. The information providing system of claim 1, wherein the content is a video work including a scene.

12. The information providing system of claim 11, wherein a position of the scene in the content is associated with a start time in minutes and an end time in minutes.

13. The information providing system of claim 11, wherein a position of the scene in the content is associated with a famous battle.

14. An information providing method performed by an information providing system capable of communicating with a viewing terminal, comprising:
acquiring, by the information providing system, a user ID identifying a user of the viewing terminal and place information indicating a place specified by the user of the viewing terminal;
acquiring, from a first storage configured to store place information indicating a place and specifying information specifying an expression part where an expression related to the place appears in content in association with each other, wherein a whole version of the content is available for purchase from the information providing system, the specifying information based on the place indicated by the acquired place information;
acquiring, from the first storage, the specifying information relating to content which has not been purchased, wherein the specifying information is stored in association with a place indicated by place information, wherein an appearance percentage based on an appearance history of the place indicated by the place information is equal to or more than a specified percentage;
determining whether the user identified by the acquired user ID has previously purchased the content corresponding to the acquired specifying information from a second storage configured to store information identifying content purchased by the user;
generating a trial read file that includes at least one portion within the content corresponding to the acquired specifying information;
transmitting the specifying information to the viewing terminal when it is determined that the user has previously purchased the content corresponding to the acquired specifying information, and
transmitting the trial read file to the viewing terminal when it is determined that the user has not previously purchased the content corresponding to the acquired specifying information.

15. The information providing method according to claim 14, wherein the first storage is configured to store data corresponding to a plurality of associations between a plurality of content and a plurality of places, and the data corresponding to each of the plurality of associations includes an identification of one of the plurality of places, an identification of at least one of the plurality of content that includes information related to the place, specifying information that specifies at least one second portion within the identified content that is related to the place and information indicating the place, and wherein the at least one of the plurality of content is a work of an author or creator.

16. The information providing method according to claim 14, further comprising:
generating map information that indicates a positional relationship between a first place identified by the acquired place information and a second place identified by the place information associated with the acquired specifying information; and
transmitting the map information to the viewing terminal;
wherein acquiring the specifying information comprises acquiring, from the first storage, the specifying information associated with the place information indicating the second place located within a specified range from the first place, the first storage being further configured to store a title of content in association with the place information and the specifying information, and
wherein the map information further indicates the title of content associated with the acquired specifying information in association with the second place,
the method further comprising:
receiving selection information representing a selection of the second place by the user of the viewing terminal after transmitting the map information to the viewing terminal, and
transmitting the acquired specifying information or the trial read file corresponding to the selected second place to the viewing terminal in response to receiving the selection information.

* * * * *